United States Patent [19]

Guill

[11] Patent Number: 4,650,137

[45] Date of Patent: Mar. 17, 1987

[54] BLAST SHIELD FOR PROTECTING ONE SEAT OF A MULTIPLE SEAT ARRANGEMENT OF AN AIRCRAFT DURING INDEPENDENT EJECTION OF THE OTHER SEAT

[75] Inventor: Frederick C. Guill, Crownsville, Md.

[73] Assignee: The United States of America as represented by the Secretary of the Navy, Washington, D.C.

[21] Appl. No.: 797,118

[22] Filed: Nov. 12, 1985

[51] Int. Cl.$^4$ .................... B64D 11/06; B64D 25/00
[52] U.S. Cl. .................... 244/121; 244/122 AG; 244/141; 244/118.6
[58] Field of Search .............. 244/121, 118.6, 122 R, 244/122 A, 122 AE, 122 AG, 122 AC, 141, 122 AD, 122 AF, 122 AB; 89/1.8, 1.812

[56] References Cited

U.S. PATENT DOCUMENTS

| | | | |
|---|---|---|---|
| 2,959,382 | 11/1960 | Turner | 244/121 |
| 3,423,121 | 1/1969 | Lipkin | 244/121 |
| 3,606,221 | 9/1971 | Morris et al. | 244/122 AD |
| 3,880,387 | 4/1975 | Martin, Jr. | 244/121 |
| 4,044,648 | 8/1977 | Piesik | 89/1.8 |

Primary Examiner—Galen Barefoot
Assistant Examiner—Lynn M. Fiorito
Attorney, Agent, or Firm—W. C. Townsend; Louis Allahut

[57] ABSTRACT

A thermal blast shield (64) is located on an aircraft (10) between two adjacent seats (20 and 22) to be stored in a housing (62) during normal aircraft operation. The thermal blast shield includes cables (84 and 86) passing through fairleads attached to the aircraft and then connected to the seats to pull the shield out of the housing and fully deploy it as the seat is ejected. A break-away mechanism (100, 102) causes the cables to break/separate after the thermal blast shield is fully deployed and jamming/locking mechanisms (104, 106) further control deployment of the thermal blast shield and preclude its post-deployment retraction. The thermal blast shield can be stowed window-shade like or accordianfold-like, and can be formed of a variety of flexible thermal resistant, blast resistant materials.

20 Claims, 12 Drawing Figures

BLAST SHIELD FOR PROTECTING ONE SEAT OF A MULTIPLE SEAT ARRANGEMENT OF AN AIRCRAFT DURING INDEPENDENT EJECTION OF THE OTHER SEAT

BACKGROUND OF INVENTION

1. Field of the Invention

The present invention relates in general to aircraft, and more particularly to aircraft escape systems. Most specifically, the present invention relates to protecting those personnel and/or equipment in other ejection seats remaining on board an aircraft from the thermal and blast effects of the ejection procedure during a multi-personel ejection procedure.

2. Description of the Prior Art

As is well known, emergencies sometimes occur during the operation of high speed high performance military aircraft. These emergencies sometimes are serious enough to require the inflight evacuation of the personnel from the aircraft. Therefore, most modern high performance military aircraft have systems for ejecting the aircraft personnel from an aircraft which may be moving at a rapid speed and may also be out of control and experiencing pitch, yaw and/or roll conditions. Under some emergency conditions, it is imperative that the personnel be removed quickly from the vicinity of an aircraft. However, it is equally important for the personnel to be able to effeciently and reliably operate the aircraft under normal conditions and to manually evacuate the aircraft if necessary. Therefore, while modern high performance aircraft must have systems for rapidly removing personnel from the aircraft, such systems must not interfere with the crew's ability to operate, or to manually exit from that aircraft.

Most aircraft personnel ejection systems include a seat which has a rocket propulsion system for rapidly removing the seat from the aircraft. The seat is movably mounted on rails for guiding the seat out of the aircraft during the ejection procedure. These seats also generally include a system for controlling seat movement after it has been separated from the aircraft mounted guide rails whereby the seat and its occupant can be moved, in a controlled manner, to enhance altitude gain and body orientation. Such control systems include means for sensing seat pitch, yaw and roll and often also include rockets for correcting unwanted seat movement. The seat can undergo pitch, yaw or roll or a complex combination of such movements, and the seat control systems must be able to react rapidly to control such movements. Furthermore, seat flight conditions may be influenced by movements of flight of the aircraft prior to and during separation of the seat from the aircraft. For example, if the aircraft is experiencing severe roll at the moment of seat separation, the seat may be correspondingly tipped with the bottom thereof moving toward one side or the other of the aircraft depending on the direction of the aircraft roll. The seat control system therefore will attempt to correct such seat tipping. In seat stabilization systems employing rockets, this is accomplished by redirecting the thrust orientation of a rocket or by firing appropriate rockets.

Such seat tipping, when combined with other conditions, may cause a seat control rocket to fire directly at the aircraft. Such a firing may cause the high temperature, high velocity rocket exhaust gases to impinge directly on the aircraft. In many situations, this is not a problem. However as will be discussed below, there has been one occurrence in which an unusual combination of events caused this possibility to be entirely unacceptable.

Many modern aircraft include an arrangement of seats to accommodate multiple crewmembers, that is, the seats are positioned adjacent to each other, either in a side-by-side or in a tandem (fore-and-aft) configuration. Therefore, the above-discussed situation in which the seat rocket exhaust gases impinge directly onto the aircraft proved to be entirely unacceptable in a procedure in which an aircraft crewmember located in a side-adjacent seat was still on board the aircraft during the ejection of the adjacent seats and had the rocket exhaust gases from the ejecting seat impinged directly on him.

There are several possible ways to prevent a reoccurrence of the above-mentiontioned unacceptable possibility. One way is to eliminate the ability of an individual crewmember to initiate self-ejection whereby both seats of a multiple seat combination are controlled by one of the seats to eject simultaneously when the control seat is ejected. However, this may endanger the crewmember in the controlled seat if the occupant of the controlling seat fails to initiate ejection procedures. Furthermore, if the system in the controlling seat fails, both seat occupants are in danger. A variation of this method would include a seat ejection system in which both seats are ejected essentially simultaneously if either seat is ejected. However, this reverses the above situation and may result in unnecessary ejections with their attendant risks in the event a crewmember panics and initiates ejection prematurely or unnecessarily. This latter condition may place a pilot under the control of a crewmember, which under many conditions is not desirable.

Another way to prevent occurrence of an unacceptable situation in which rocket exhaust from an ejecting seat impinges on personnel in the aircraft is to delay firing of the ejection seat rockets for a predetermined time after separation from the aircraft. However, during this delay, the seat is not being actively propelled or controlled and may fail to gain sufficient height above aircraft and/or terrain and, in addition may become unstable enough where it cannot be brought sufficiently under control for proper parachute deployment. Introduction of such delays also entails a reduction in rocket ignition reliability. Such conditions are not acceptable.

Furthermore, adding means which change the existing aircraft seat ejection systems or procedures must be tested and proved effective before modifying aircraft and aircraft specifications. Such a requirement may be costly and time consuming.

Therefore, modifying aircraft ejection seats, seat ejection sequencing or procedures do not appear to be viable ways of preventing a reoccurrence of a situation in which rocket exhaust gases from an ejecting seat of an aircraft multiple seat configuration impinged on personnel in the other seat still aboard the aircraft.

Accordingly, it will be necessary to provide equipment which permits either seat of such a multiple seat combination to eject as in the present situation, but which automatically protects onboard personnel during ejection of the other seat. Such equipment must be simple to reduce the possibility of malfunctioning, and to permit rapid and expeditious testing and implementation of the equipment into aircraft specifications. The equipment should also be amenable to retrofit procedures so that existing aircraft can be expeditiously modified.

Furthermore, to obviate the problems discussed above with regard to ejection sequencing procedures, the equipment should be capable of being actuated by either seat independently of the other seat. In this manner, neither seat occupant's protection is dependent upon or adversely influenced by the operation of, or lack of operation of, the other seat. Nor should the equipment interfere with the operation of the seat being ejected during the ejection procedure.

Yet a further requirement for such protection equipment is that it should not interfere with the operation of the aircraft. For example, the equipment cannot form an impediment to verbal or visual communication between the personnel in the aircraft or with the actual control of the aircraft during aircraft operation. Furthermore, this equipment should not create a clausterphobic situation in the aircraft or interfere in any way with manual egress should such procedure become necessary. Therefore, the the equipment must be designed to be located well out of the way during normal aircraft operation, yet be automatically, quickly and reliably deployed during an ejection procedure.

Prior art ejection systems have focused on protecting the occupant of the ejecting seat itself from the ejection environment external to the aircraft, see, e.g., U.S. Pat. Nos. 2,579,683, 2,965,335 and 3,630,472; or to preventing one ejected seat from physically interfering with another ejected seat, see e.g., U.S. Pat. Nos. 3,606,221, 3,648,955 and 4,225,101. However, the known prior art has not approached the problem of protecting personnel remaining onboard an aircraft against the exhaust gases of rockets of a seat which has been ejected from that aircraft.

OBJECTS OF THE INVENTION

It is a main object of the present invention to protect an occupant of one seat of an aircraft multiple seat combination during ejection of the other seat from the aircraft.

It is another object of the present invention to protect an occupant of one seat of a side-by-side aircraft seat combination during ejection of the other seat from the aircraft.

It is another object of the present invention to protect an occupant of one seat of a tandem aircraft seat combination during ejection of the other seat from the aircraft.

It is another object of the present invention to provide equipment which protects an occupant of one seat of an aircraft multiple seat combination during ejection of any other seat from the aircraft.

It is another object of the present invention to provide equipment which protects one seat of an aircraft multiple seat combination during ejection of any other seat and which is stowable to be essentially completely out of the way during normal aircraft operation yet which is quickly, reliably and automatically deployed during ejection of any seat of the multiple seat combination.

It is another object of the present invention to provide equipment for protecting an occupant of one seat of an aircraft multiple seat combination during ejection of any other seat which is simple in design and can be expeditiously retrofitted into existing aircraft and included in new aircraft production without requiring extensive expensive testing programs or expensive alteration to existing equipment or specifications.

It is another object of the present invention to provide equipment for protecting an occupant of one seat of an aircraft multiple seat combination during ejection of another seat but which does not interfer with the ejection of that other seat.

SUMMARY OF THE INVENTION

These and other objects are accomplished by providing a thermal blast shield which is located between the seats of a aircraft multiple seat combination. The thermal blast shield is stowed out of the way during normal aircraft operation, but is quickly and automatically deployed during ejection of any adjacent seat from the aircraft into position before the exhaust gases from an ejecting seat can contact the occupant of a non-ejecting seat. The thermal blast shield is flexible to be collapsed on itself either by rolling or folding and includes cables coupling it to both of the seats in a manner such that the shield is stretched out to be interposed between the seats as one of the seats moves out of the aircraft during an ejection procedure. The cable includes means for holding the shield in the deployed condition once it is fully deployed and means for breaking the cable away from the ejected seat so as not to interefere with the ejection or subsequent functioning of that seat or elements thereof.

BRIEF DESCRIPTION OF THE PREFERRED EMBODIMENT

Figure 1:
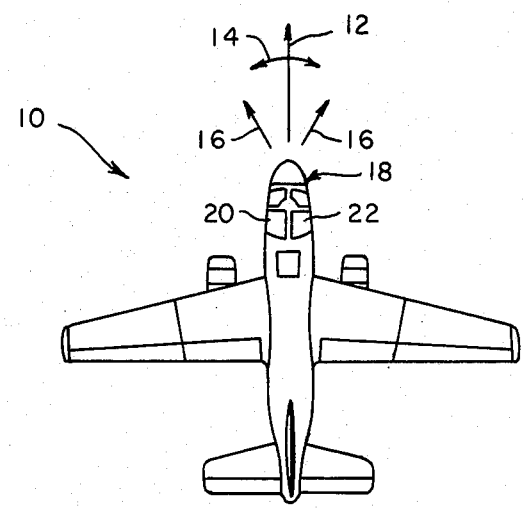
FIG. 1 is a schematic representation of an S-3 aircraft having a multiple seat arrangement.
Figure 2:
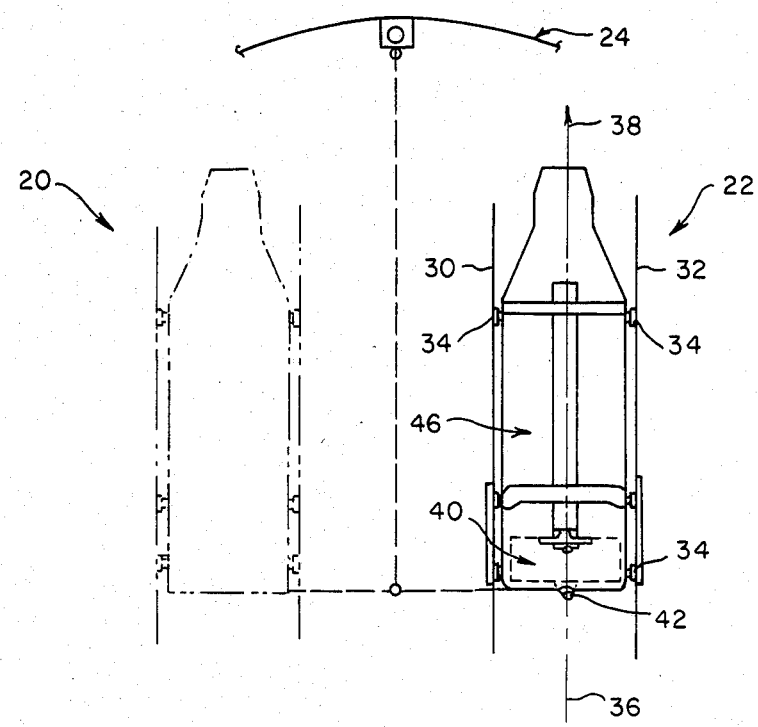
FIG. 2 is a schematic representation of an aircraft side-by-side multiple seat arrangement.

Shown in FIG. 1 is a high performance aircraft 10 following a flight path 12 and capable of undergoing roll as indicated by arrow 14 yaw, as indicated by arrows 16, or pitch. The aircraft 10 includes a multiple seat arrangement of both a side-by-side type and a fore-and-aft type. The side-by-side type is shown in FIG. 2, and includes a left-hand seat 20 and a right-hand seat 22.

As was discussed above, such high performance aircraft occasionally require ejection of the personnel therefrom. This is accomplished using ejection seats, and these seats, 20 and 22, are best shown in FIG. 2 in the normal configuration beneath a canopy 24 and on each side of a vertical centerline of the aircraft. Both seats 20 and 22 are mounted on guide rails 30 and 32 by rollers or slippers, such as roller 34. The seats are of the usual and are adapted to be moved upwardly along the guide rails during an ejection procedure toward canopy 24 in direction 38.

Figure 3:
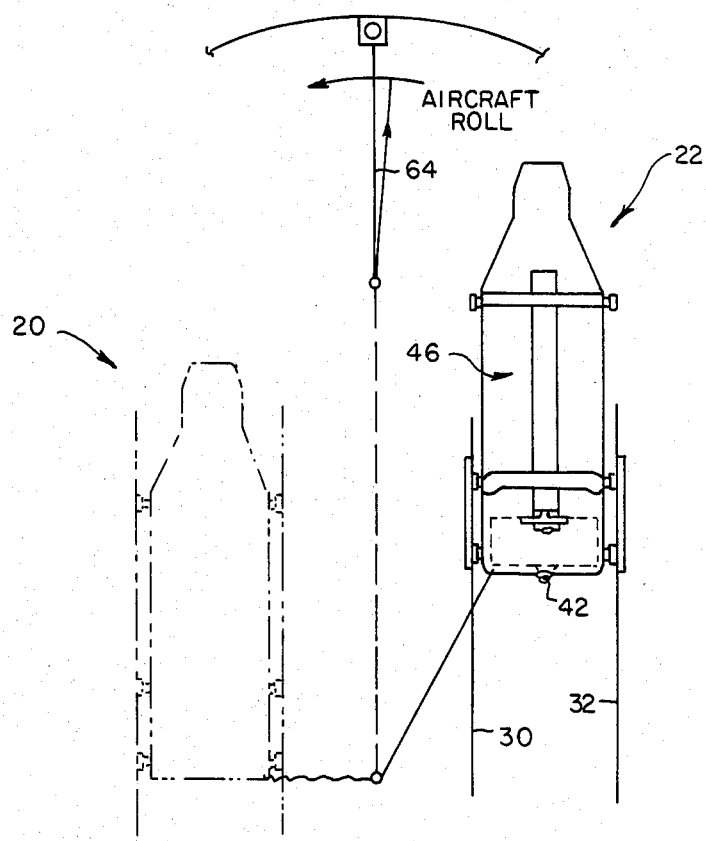
FIG. 3 is a schematic representation of the FIG. 2 seat ararngement as a right-hand seat begins to eject.
Figure 4:
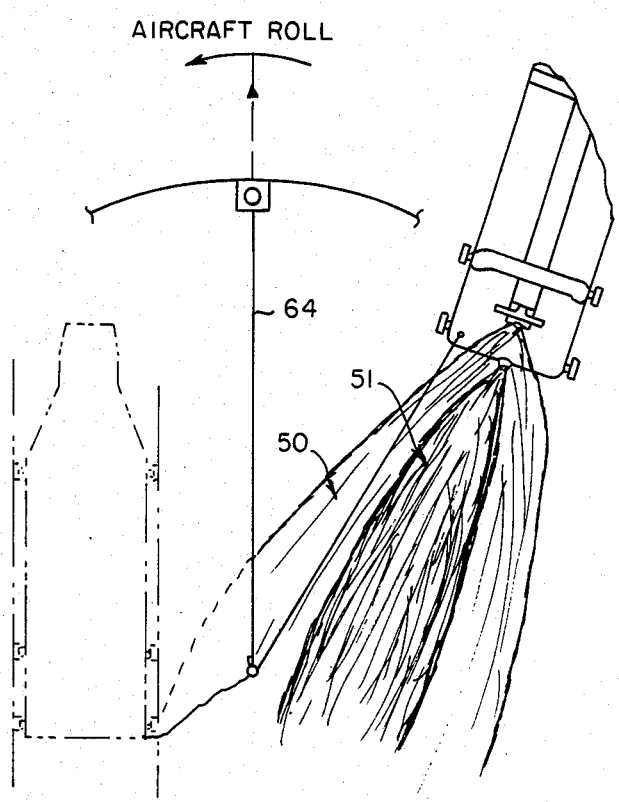
FIG. 4 shows the ejection of a right hand seat of a side-by-side multiple seat arrangement with deployment of the thermal blast shield embodying the present invention.

Each ejection seat includes a ballistic catapult and rocket propulsion system 40 which has a rocket nozzle 42 for propelling the ejection seat, and the occupant is accommodated in the central section 46 thereof. As best shown in FIG. 3, an independently initiated ejection procedure begins for right hand seat 22 as it moves along rails 30 and 32 toward the tops 42 of those rails, while left-hand seat 20 and its occupant remain stationary on board the aircraft. As is also shown in FIG. 3, the aircraft may be rolling toward the left-hand seat during ejection of the right hand seat. As the seat leaves the rails 30 and 32, the leftward roll of the aircraft tilts the rocket nozzle 42 of that seat toward the left-hand seat as indicated in FIG. 4. Firing the rocket propulsion system 40 therefore sends exhaust gases 50 and 51 toward the left-hand seat. Unchecked, these gases will move across the left-hand seat as indicated in phantom lines in FIGS. 4 and 5. Such a situation damages protective garments and equipment and causes burn injury to the crewman all of which are quite undesirable.

Figure 6C:
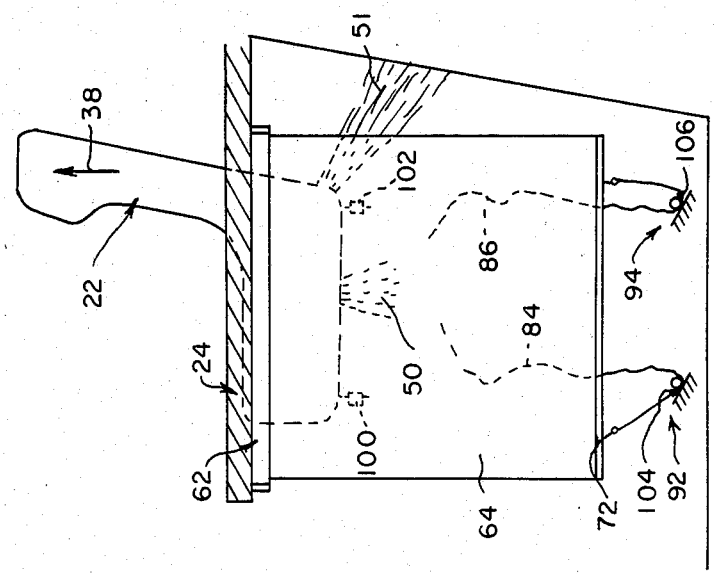
FIGS. 6A–6C are schematics of the thermal blast shield embodying the present invention during deployment thereof.
Figure 6B:
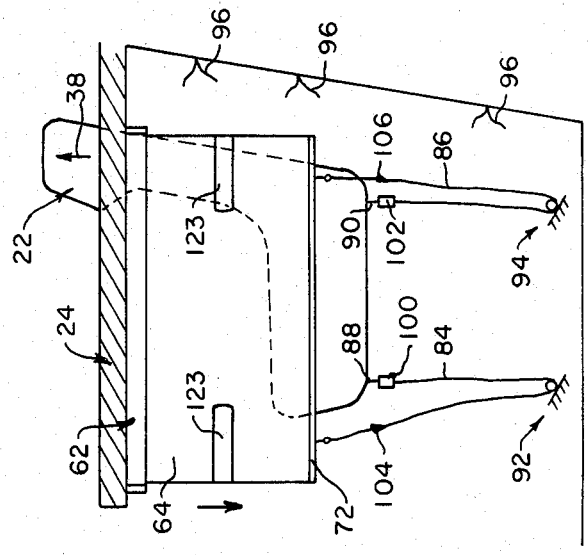
Figure 6A:
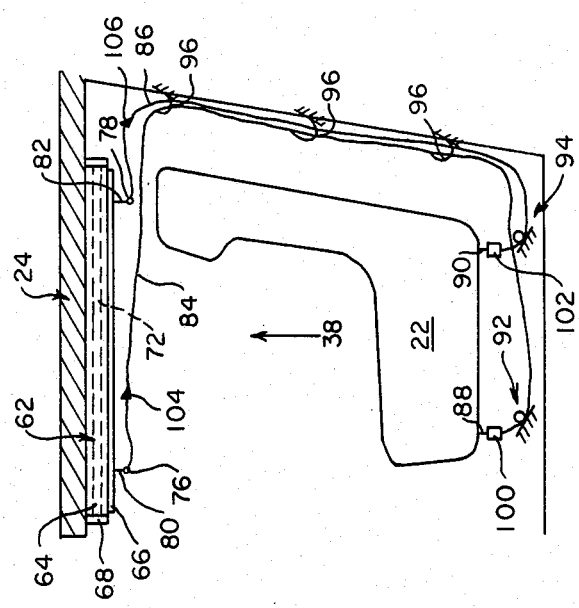

To prevent such gases from contacting the left-hand seat and its occupant, a thermal blast shield mechanism 60 is provided and is shown schematically in FIGS. 6A-6C in association with right-hand seat 22. The thermal blast shield mechanism includes a housing 62 mounted on the aircraft at or near the canopy 24 between the two seats 20 and 22 to extend along the aircraft centerline between those seats. The seat is shown in a gross outline form in the interest of clarity. Only one seat is shown, but it is understood that both seats are essentially identical. A thermal blast shield 64 is collapsible on itself and is stored within the housing, and is shown in FIG. 6A as being a window-shade type arrangement which is rolled up on a support rod 66 and having a spring mechanism 68 similar to those common to such window-shade devices.

The thermal blast shield 64 is a flexible material, such as an aramid-type material. Suitable aramid type materials include Nomex and Kelvar; however other light, flexible thermal resistant and blast resistant materials may also be suitable as the thermal blast shield is only a single use item and needs only remain intact long enough for the first ejected adjacent Figure seat to clear the canopy, after which its complete failure or destruction would not endanger the occupant of the remaining seat.

The thermal blast shield 64 includes a stiffener 72 at one end thereof and has a pair of pull rings 76 and 78 attached to that stiffener via cables 80 and 82 respectively.

The thermal blast shield mechanism further includes cords, cables or straps 84 and 86 one pair of which is attached at one end thereof to the ring 76 and one pair of which is similarly attached to ring 78. The cables couple the blast shield to the ejection seats during nonejecting aircraft operation when the blast shield is in the stowed confuguration, and extend longitudinally along the aircraft centerline structure aft of seat 22 and are connected one of each aft pair to the seat aft end at a connector 90 and one to the seat forward end at a connector 88 after being trained around fairlead elements 92 and 94 respectively. The others of each pair of cables are similarly rotated and connected to the adjacent seat. The mechanisms 92 and 94 are mounted on the aircraft.

In the mechanism stored condition, the cables 84 and 86 are maintained in a channel-like housing or retained by break-ties 96 mounted on the aircraft. Each of the breakties 96 serves as a means which keeps the cord within the desired stowed location out of the way during storage but which permits the cord to move in a manner necessary to deploy the blast shield. In some instances the breakties 96 can include guide means associated with the thermal blast shield 64 to guide that shield during deployment thereof. Tracks similar to those associated with window shades or other such means are suitable for this function. The cables are attached to the seat by automatic load-limit mechanisms for break-away mechanisms 100 and 102 whereby, after the seat has moved far enough to fully deploy the thermal blast shield between the ejected seat and the remaining seat, the cables will break away from the ejected seat without residual portions attached to the seat of length to induce fouling or other problems. The cables also have a jamming/locking means 104 and 106 thereon which jam/lock into the fairlead mechanism to prevent the thermal blast shield from being rolled back up by the spring mechanism 69 or blown aside by rocket blast or windblast and which also provide sufficient resistance to further deployment of the thermal blast shield to activate the breakway mechanisms 100 and 102. The rocket exhaust plumes 50 and 51 are indicated in FIG. 6C to illustrate the relationship of those plumes to the fully deployed blast shield. FIG. 6C shows that the blast shield is located between the ejected seat and the adjacent seat.

Figure 5:
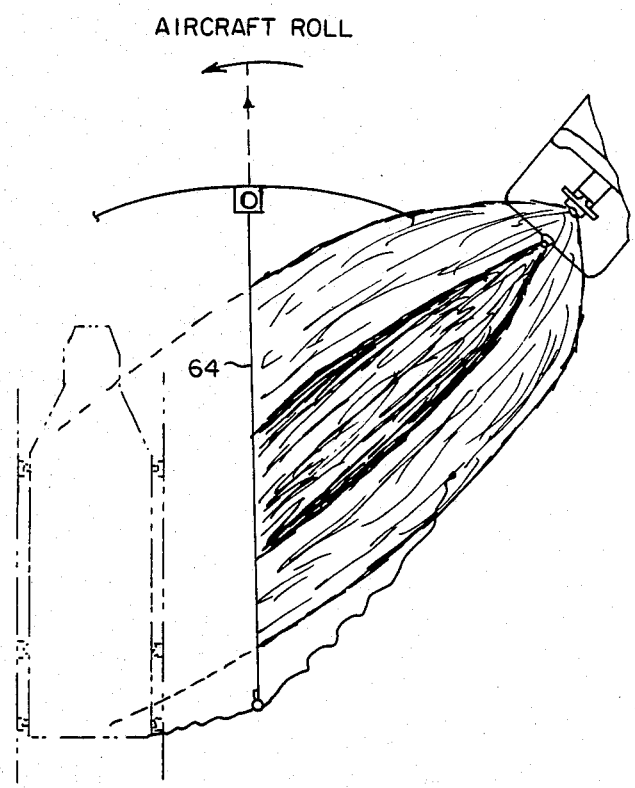
FIG. 5 shows the nearly completed ejection of the right hand seat of the FIG. 3 arrangement.

Deployment of the thermal blast shield configuration to a fully deployed configuration can also be seen in FIGS. 3, 4, and 5. The cable can be adjusted to include a lost motion portion whereby normal seat movement will not deploy the thermal blast shield but blast shield deployment will be initiated immediately upon initiation of ejection procedures.

Figure 7:
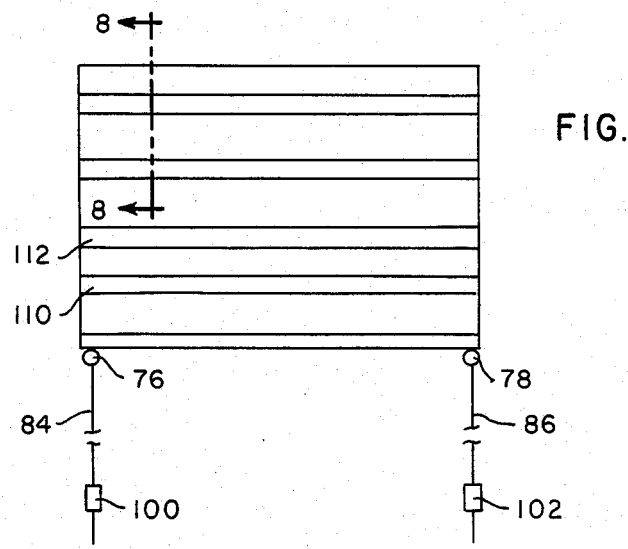
FIG. 7 shows one embodiment of the thermal blast and shield of the present invention.
Figure 8:
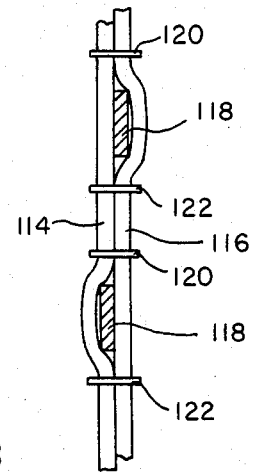
FIG. 8 is a view taken along line 8—8 of FIG. 7.

The thermal blast shield 64 is also shown in FIG. 7 in a fully deployed configuration and can include a plurality of stiffeners similar to sail battens such as stiffeners 110 and 112. Furthermore, as shown in FIG. 8, the blast shield can include a plurality of plys, such as plys 114 and 116 with stiffeners 118 interposed therebetween and held in place by fasteners 120 and 122 adjacent thereto. Batten pockets are also shown in FIG. B.

Figure 9:
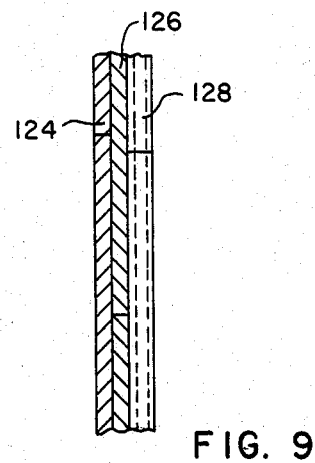
FIG. 9 is a partial view of a cross-section of another embodiment of the present invention.
Figure 10:
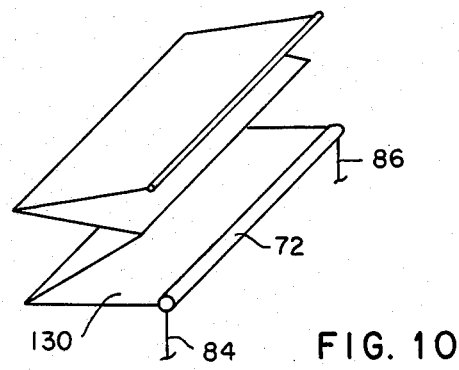
FIG. 10 is a schematic of a fan-foldable thermal blast shield.

As shown in FIG. 9, the thermal blast shield can also include a plurality of off-set plys, such as plys 124, 126, and 128, or as shown in 10, the thermal blast shield can be accordian-folded in the stowed configuration having a multiplicity of sections 130. Other folded configurations can also be used if suitable.

The disclosure has been directed to side-by-side seats; however, fore-and-aft seats can also be protected by the blast shield mechanism 60 without departing from the scope of this disclosure. Furthermore, the fairlead mechanisms can include a ratchet-type mechanism to ensure unidirectional cable deployment without return slippage.

I claim:

1. A means for protecting an occupant of one seat of an aircraft multiple arrangement from exhaust gases associated with activation of another seat of the seat arrangement during an ejection procedure, comprising:

a thermal blast shield means movably mounted on the aircraft adjacent to an ejection seat for deflecting from crewmembers and equipment exhaust gases generated by a rocket associated with the ejection of the adjacent seat during a seat ejection procedure;

thermal blast shield means being adapted to assume a stowed configuration and a deployed configuration; and a connecting means coupling said thermal blast shield means to the aircraft ejection seat during non-ejecting aircraft operation when said thermal blast shield means is in said stowed configuration for initiating deployment of said blast shield means immediately upon initiation of ejection procedures and moving said thermal blast shield means out of said stowed configuration into said deployed configuration as the aircraft ejection seat is ejected out of the aircraft and before the exhaust gases from the ejecting seat can contact the occupant of the non-ejecting seat.

2. The means defined in claim 1 wherein said thermal blast shield means includes a plurality of sections which are collapsed on each other in said stowed configuration.

3. The means defined in claim 2 including a further ejection seat located adjacent to said thermal blast shield means to be protected by said thermal blast shield means.

4. The means defined in claim 3 wherein said thermal blast shield means includes flexible, blast-resistant, thermal-resistant material.

5. The means defined in claim 4 wherein said thermal blast shield means includes an aramid like material.

6. The means defined in claim 3 wherein the aircraft ejection seats are positioned in side-by-side relationship.

7. The means defined in claim 3 wherein the aircraft ejection seats are positioned in tandem relationship.

8. The means defined in claim 1 wherein said connecting means includes a cable trained around a fairlead mounted on the aircraft and attached at one end to said thermal blast shield means and at the other end to the airplane ejection seat near one end of the seat.

9. The means defined in claim 8 wherein said connecting means further includes an automatic load limit disconnect means in said cable for separating said cable upon completion of thermal blast shield deployment at a predetermined location on the cable under a predetermined amount of stress.

10. The means defined in claim 1 further including stowing means on the aircraft for accommodating said thermal blast shield means in the stowed configuration, said stowing means including means for closing said stowing means.

11. The means defined in claim 10 wherein said stowing means includes connecting means accommodating means for stowing said connecting means.

12. The means defined in claim 11 wherein said connecting means accomodating means includes breakties.

13. The means defined in claim 1 wherein said thermal blast shield means includes a plurality of layers.

14. The means defined in claim 1 wherein said connecting means includes a strap.

15. The means defined in claim 1 wherein said connecting means includes a cable.

16. The means defined in claim 1 wherein said thermal blast shield is rolled up on itself in a windowshade-like manner in the stowed configuration.

17. The means defined in claim 1 wherein said thermal blast shield is accordian folded in the stowed configuration.

18. The means defined in claim 1 wherein said thermal blast shield includes a plurality of stiffeners.

19. The means defined in claim 1 further including locking means on said connecting means for holding said thermal blast shield in a fully deployed configuration.

20. The means defined in claim 19 wherein said connecting means includes jam means on said cables for locking said cables to said fairleads.

* * * * *